United States Patent
Suzuki et al.

(10) Patent No.: US 10,024,511 B2
(45) Date of Patent: Jul. 17, 2018

(54) SEMICONDUCTOR LIGHT-EMITTING APPARATUS AND VEHICLE HEADLIGHT

(71) Applicant: Stanley Electric Co., Ltd., Tokyo (JP)

(72) Inventors: Naoto Suzuki, Tokyo (JP); Takahiko Nozaki, Tokyo (JP); Takeshi Waragaya, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 306 days.

(21) Appl. No.: 14/951,609

(22) Filed: Nov. 25, 2015

(65) Prior Publication Data
US 2016/0146415 A1 May 26, 2016

(30) Foreign Application Priority Data
Nov. 25, 2014 (JP) .................................. 2014-238266

(51) Int. Cl.
*F21S 8/00* (2006.01)
*F21S 8/10* (2006.01)
(Continued)

(52) U.S. Cl.
CPC ........... *F21S 48/1145* (2013.01); *F21S 41/14* (2018.01); *F21S 41/16* (2018.01); *F21S 41/192* (2018.01);
(Continued)

(58) Field of Classification Search
None
See application file for complete search history.

(56) References Cited

U.S. PATENT DOCUMENTS 5,361,316 A * 11/1994 Tanaka ................. G02B 6/32
385/119
5,803,575 A * 9/1998 Ansems ............... G02B 6/0006
362/554
(Continued)

FOREIGN PATENT DOCUMENTS

EP  2 796 771 A1  10/2014
JP  2006-61685 A  3/2006
(Continued)

OTHER PUBLICATIONS

The extended European search report for the related European Patent Application No. 151959632 dated May 2, 2016.

*Primary Examiner* — Britt D Hanley
(74) *Attorney, Agent, or Firm* — Kenealy Vaidya LLP

(57) ABSTRACT

A reliable semiconductor light-emitting apparatus including an optical fiber and a wavelength converting layer and a headlight using the semiconductor light-emitting apparatus can include a ferrule holder attaching the wavelength converting layer. The ferrule holder can also attach a first ferrule covering the optical fiber, which transmits light emitted from a semiconductor light-emitting chip toward the wavelength converting layer. When the light-emitting apparatus is used for the headlight, the apparatus can be easily incorporated into a prescribed position of the headlight with confidence via a lamp holder. Thus, the disclosed subject matter can provide reliable semiconductor light-emitting apparatuses having a high radiating efficiency that can emit various color lights including a substantially white color tone having favorable optical characteristics, which can be used for general lighting, a street light, stage lighting and the like, and which can be used for the headlight that can provide a favorable light distribution pattern.

20 Claims, 14 Drawing Sheets

(51) Int. Cl.
*F21S 41/14* (2018.01)
*F21V 8/00* (2006.01)
*F21S 41/19* (2018.01)
*F21S 41/24* (2018.01)
*F21S 41/16* (2018.01)
*F21V 9/30* (2018.01)

(52) U.S. Cl.
CPC ............. *F21S 41/198* (2018.01); *F21S 41/24* (2018.01); *F21V 9/30* (2018.02); *G02B 6/0006* (2013.01); *G02B 6/0008* (2013.01)

(56) References Cited

U.S. PATENT DOCUMENTS

| | | | |
|---|---|---|---|
| 9,057,512 B2 * | 6/2015 | En | F21V 21/34 |
| 9,076,952 B2 | 7/2015 | Saito et al. | |
| 2008/0075406 A1 * | 3/2008 | Kadomi | G02B 6/262 |
| | | | 385/79 |
| 2008/0089089 A1 * | 4/2008 | Hama | A61B 1/0653 |
| | | | 362/574 |
| 2011/0279007 A1 * | 11/2011 | Kishimoto | B60Q 1/0011 |
| | | | 313/45 |
| 2012/0063157 A1 * | 3/2012 | Nakazato | F21S 48/1145 |
| | | | 362/517 |
| 2014/0321151 A1 | 10/2014 | Sato et al. | |
| 2015/0366432 A1 * | 12/2015 | Artsyukhovich | A61B 1/0011 |
| | | | 600/166 |
| 2016/0146415 A1 * | 5/2016 | Suzuki | F21S 48/1145 |
| | | | 362/553 |
| 2016/0166139 A1 * | 6/2016 | Bacher | A61B 3/0008 |
| | | | 600/249 |

FOREIGN PATENT DOCUMENTS

| | | |
|---|---|---|
| JP | 2008-76798 A | 4/2008 |
| JP | 2012-9381 A | 1/2012 |
| JP | 2013-109928 A | 6/2013 |
| JP | 2013-196818 A | 9/2013 |
| WO | 2007/046498 A1 | 4/2007 |
| WO | 2014/038556 A1 | 3/2014 |

* cited by examiner

Exemplary concavo-convex shapes

Enlarged cross-sectional views at mark 51

Perspective views

SEMICONDUCTOR LIGHT-EMITTING APPARATUS AND VEHICLE HEADLIGHT

This application claims the priority benefit under 35 U.S.C. § 119 of Japanese Patent Application No. 2014-238266 filed on Nov. 25, 2014, which is hereby incorporated in its entirety by reference.

BACKGROUND

1. Field

The presently disclosed subject matter relates to semiconductor light-emitting apparatuses including an optical fiber, in which light emitted from a semiconductor light source is wavelength-converted by a wavelength converting layer, and to vehicle headlights using the semiconductor light-emitting apparatuses. More particularly, the disclosed subject matter relates to reliable semiconductor light-emitting apparatus having a high thermal conductivity and a high workability, which can be used for a vehicle lamp and the like, and to the vehicle headlights using such semiconductor light-emitting apparatuses.

2. Description of the Related Art

Semiconductor light-emitting devices, in which a part of light emitted from a semiconductor light-emitting chip is converted into light having a different wavelength by a wavelength converting layer and in which a mixture light including the light having the different wavelength mixed with the light emitted directly from the semiconductor light-emitting chip is emitted, have been used as a light source for various lighting units. In this case, semiconductor light-emitting apparatuses, in which the semiconductor light-emitting chip may be located at a desired position by using an optical fiber, have also been known.

A conventional vehicle headlight using a semiconductor light-emitting apparatus including a wavelength converting layer and an optical fiber is disclosed in Patent Document No. 1 (Japanese Patent Application Laid Open JP2013-109928). FIG. 13 is a schematic partial side cross-sectional view showing the conventional vehicle headlight using the semiconductor light-emitting apparatus, which is disclosed in Patent Document No. 1.

The conventional vehicle headlight 60 includes: a reflector 65 including a first opening 67 and a second opening located in an opposite direction of the first opening 67; a transparent filter 68 covering the second opening of the reflector 65; an outer lens 62 located in a forward direction of the transparent filter 68; a makeup panel 61 formed in a substantially ring shape, located adjacent the outer lens 62, and surrounding the transparent filter 68; a casing 63 attaching the reflector 65, the makeup panel 61 and the outer lens 62 thereto; a laser light source 64 having a laser light-emitting surface 64A and an optical fiber 64B, including a wavelength converting material, and attached to the reflector 65, and the laser light-emitting surface 64A being exposed from an end of the optical fiber 64B; a ferrule 66 covering the end portion of the optical fiber 64B; and a laser device 69 configured to emit a laser beam, and incorporated into the casing 63, wherein the optical fiber 64B transmits the laser beam toward the laser light source 64, which emits a mixture light mixing a part of light emitted directly from the laser device 69 with light having a different wavelength wavelength-converted by the wavelength converting material using another part of the laser beam emitted directly from the laser device 69, toward the optical lens 62 via the transparent filter 68.

Accordingly, the conventional vehicle headlight 60 may emit the mixture light having a substantially white color tone from a light-emitting surface of the laser light source 64 toward a road. In the conventional vehicle headlight 60, an amount of heats generated from the wavelength converting material and the laser device 69 may be divided between the laser light source 64 including the wavelength converting material and the laser device 69, which is incorporated into the casing 63, by using the optical fiber 64B. Hence, the conventional vehicle headlight 60 may prevent keeping a large amount of the heat in a space between the reflector 65 and the transparent filter 68, and therefore may improve reliability thereof.

However, in such a structure, in which the laser light source 64 is attached to the reflector 65 in an inward direction of the reflector 65 and also the ferrule 66 is attached to the laser light source 64 in an inward direction of the first opening 67 of the reflector 65, when the vehicle headlight 60, which is incorporated into a vehicle moving, vibrates with violence and/or has a big external shock, the laser light source 64 connecting the ferrule 66 may drop out from the reflector 65. Additionally, because the ferrule 66 connecting the optical fiber 64B may widely vibrate in the first opening 67 of the reflector 65 and also the optical fiber 64B may widely swing between the reflector 65 and the casing 63, the ferrule 66 may drop out from the laser light source 64.

Meanwhile, another conventional vehicle headlight using a reliable semiconductor light-emitting apparatus including a wavelength converting layer and an optical fiber is disclosed in Patent Document No. 2 (Japanese Patent Application Laid Open JP2013-1196818). FIG. 14 is a schematic enlarged side cross-sectional view showing a conventional semiconductor light-emitting apparatus having high reliability for the other conventional vehicle headlight, which is disclosed in Patent Document No. 2.

The conventional semiconductor light-emitting apparatus 70 includes: a light source 75 configured to emit an excited light; a holder 77 having an opening 77a, and attaching the light source 75 thereto; an optical fiber 71 having a first end 71a and a second end 71b, which are exposed from the optical fiber 71 to use the first end 71a as an incident surface and to use the second end 71b as a light-emitting surface, and attached into the opening 77a of the holder 77 so that the first end 71a (the incident surface) can receive the excited light emitted from the light source 75; a focusing lens 76 arranged between the light source 75 and the first end 71a of the optical fiber 71; a ferrule 72 covering the second end portion of the optical fiber 71, and attaching the optical fiber 71 thereto; a wavelength converting material 74 contacting the second end 71b (the light-emitting surface) of the optical fiber 71 and the ferrule 72; a supporter 73 having a light-emitting opening 73a formed in a substantially ring shape, attaching the ferrule 72 and the wavelength converting material 74 thereto, and the light-emitting opening 73a exposing a part of the wavelength converting material 74 from the supporter 73, and facing the first end 71b of the optical fiber 71 via the part of the wavelength converting material 74.

According to the conventional semiconductor light-emitting apparatus 70, the excited light emitted from the light source 75 can be transmitted from the incident surface (71a) of the optical fiber 64B toward the light-emitting surface (71b) of the optical fiber 64B via the focusing lens 76, and can become a mixture light mixing a part of the excited light emitted from the light source 75 with light having a different wavelength wavelength-converted by the wavelength converting material 74 using another part of the excited light. Therefore, the semiconductor light-emitting apparatus 70 can emit the mixture light having a substantially white color tone from the light-emitting opening 73, which exposes the part of the wavelength converting material 74 from the supporter 73

When the semiconductor light-emitting apparatus 70 is used as a light source device for a vehicle headlight, an amount of heats generated from the wavelength converting material 74 and the light source 75 can be divided between the supporter 73 attaching the wavelength converting material 74 thereto and the holder 77 attaching the light source 75 thereto, which can also operate as a radiator, respectively. Accordingly, the vehicle headlight using the light-emitting apparatus 70 can also prevent keeping a large amount of the heat in a lamp house thereof, and therefore may improve reliability thereof.

When each of the above-described semiconductor light-emitting apparatuses shown in FIG. 13 and FIG. 14 is used as a light source device for the vehicle headlight, the light-emitting surface of each of the semiconductor light-emitting apparatuses requires to be attached at a prescribed position of the vehicle headlight to provide a favorable light distribution pattern for drivers, respectively. However, the vehicle headlight may be extremely big as compared with the light-emitting surface of each of the semiconductor light-emitting apparatuses, and the optical fiber connecting the light-emitting surface may be very thin (e.g., diameter of several millimeters) and may be flexible.

Therefore, it may be difficult to attach the light-emitting surface at the prescribed position of the vehicle headlight along with the optical fiber, etc. When a misalignment of the light-emitting surface occurs with respect to the prescribed position of the vehicle headlight, the vehicle headlight may not provide the favorable light distribution pattern for the drivers. Accordingly, the light-emitting surface should require to be attached at the prescribed position of the vehicle headlight in an accurate fashion to always provide the favorable light distribution pattern for the drivers. Additionally, the light-emitting surface should require to be attached at the prescribed position of the vehicle headlight with confidence so that the optical fiber and the like cannot drop out from the vehicle headlight, even when the vehicle headlight vibrates with violence and/or has a big external shock.

The above-referenced Patent Documents and additional Patent Documents are listed below, and are hereby incorporated with their English abstracts in their entireties.
1. Patent Document No. 1: Japanese Patent Application Laid Open JP2013-109928
2. Patent Document No. 2: Japanese Patent Application Laid Open JP2013-196818
3. Patent document No. 3: U.S. Pat. No. 9,076,952

The presently disclosed subject matter has been devised to consider the above and other problems, features, and characteristics in the conventional art devices. Embodiments of the disclosed subject matter can include reliable semiconductor light-emitting apparatuses that can emit a mixture light having favorable optical characteristics and a high workability, which can include an optical fiber and a wavelength converting layer, and which can be used for a vehicle lamp and the like, and. Accordingly, the semiconductor light-emitting apparatuses can emit the mixture light including a substantially white color tone having a high intensity from a small light-emitting surface, which can be used for lighting units such as a vehicle headlight that controls light emitted from the semiconductor light-emitting apparatus using a reflector and/or a projector lens. The disclosed subject matter can also include a vehicle headlight using the semiconductor light-emitting apparatuses with a simple structure, which provide a favorable light distribution pattern for drivers.

SUMMARY

The presently disclosed subject matter has been devised in view of the above and other problems, features, and characteristics in the conventional art, and to make changes to existing semiconductor light-emitting apparatuses. Thus, an aspect of the disclosed subject matter provides reliable semiconductor light-emitting apparatuses including an optical fiber and a wavelength converting layer that can emit various color lights including a substantially white color light having favorable optical characteristics, which can be used for a vehicle lamp, general lighting, a street light, stage lighting, etc. Another aspect of the disclosed subject matter provides vehicle headlights using the reliable semiconductor light-emitting apparatuses, which can provide a favorable light distribution pattern, even when the semiconductor light-emitting apparatuses have been emitted for a long time in a small sealed housing.

According to an aspect of the disclosed subject matter, a semiconductor light-emitting apparatus can include: a casing having an casing opening facing a casing opening; a semiconductor light-emitting chip having a chip optical axis located on the base board of the casing; an optical fiber having a light-emitting portion including a light-emitting surface and an incident portion including an incident surface, each of the light-emitting surface and the incident surface exposed from the optical fiber, the incident portion of the optical fiber attached into the casing opening of the casing, and the incident surface facing the semiconductor light-emitting chip and intersected with the chip optical axis of the semiconductor light-emitting chip; a first ferrule covering the light-emitting portion of the optical fiber, and holding the optical fiber, and an outer surface thereof including at least one of a convex portion and a concave portion; a ferrule holder formed in a substantially tubular shape, covering the first ferrule and attaching the first ferrule via an adhesive material, and an inner surface thereof including at least one of a concave portion and a convex portion; a wavelength converting layer formed in a substantially planar shape, including at least one phosphor, covering the light-emitting surface of the optical fiber and attached on a top surface of the first ferrule; and wherein a bottom surface of the first ferrule contacts with the convex portion of the ferrule holder, and a top surface of the wavelength converting layer projects from a top surface of the ferrule holder.

In the above-described exemplary semiconductor light-emitting apparatus, the convex portion of the ferrule holder can insert into the concave portion of the first ferrule and/or the convex portion of the first ferrule can insert into the concave portion of the first ferrule.

In the above-described exemplary semiconductor light-emitting apparatuses, the semiconductor light-emitting apparatuses cant further include a second ferrule located between the incident portion of the optical fiber and the casing opening of the casing, attaching the incident portion thereto and being attached into the casing opening, and also can include a focus lens located between the incident surface of the optical fiber and the semiconductor light-emitting chip, and attached to the casing, wherein a lens optical axis thereof corresponds to the substantially chip optical axis of the semiconductor light-emitting chip, and further can include a reflecting ring formed in a substantially ring shape, and contacting with a side surface of the wavelength converting layer. Additionally, the first ferrule can include a plurality of the at least ones of a convex portion and a concave portion, and also the first ferrule can include a plurality of the at least ones of a concave portion and a convex portion corresponding to each of the at least ones of a convex portion and a concave portion, respectively. The at least one of a convex portion and a concave portion of the first ferrule can be formed in a substantially ring shape, and also the at least one of a concave portion and a convex portion of the first ferrule can be formed in a substantially ring shape so as to correspond to the at least ones of a convex portion and a concave portion of the first ferrule. Moreover, a semiconductor laser diode emitting blue light can be used as the semiconductor light-emitting chip, and the YAG phosphor ceramic can be used as the wavelength converting layer so that the light-emitting apparatus can emit white light.

According to the above-described exemplary semiconductor light-emitting apparatus, the apparatus can realize a high thermal resistance, a high radiation performance and the like by attaching the wavelength converting layer on the top surface of the ferrule holder having a high thermal conductivity and by locating a semiconductor light-emitting chip at a place away from the wavelength converting layer. Thus, the disclosed subject matter can provide reliable semiconductor light-emitting apparatuses including an optical fiber and a wavelength converting layer that can emit various color lights including a substantially white color light having favorable optical characteristics, which can be used for a vehicle lamp, general lighting, a street light, stage lighting, etc.

Another aspect of the disclosed subject matter includes vehicle headlights using the above-described semiconductor light-emitting apparatus. An exemplary vehicle headlight can include a housing; a projector lens having a projector optical axis and at least one focus, attached to the housing; a reflector having at least one focus facing the projector lens, and attached to the housing; the lamp holder being attached to the housing; the semiconductor light-emitting apparatus having the light-emitting optical axis attached to the lamp holder; and wherein the projector optical axis of the projector lens intersects with the reflector, and the light-emitting optical axis intersects at a point where the substantially projector optical axis of the projector lens intersects with the reflector.

According to the exemplary vehicle headlight, the disclosed subject matter can provide vehicle headlights using the semiconductor light-emitting apparatus with a simple structure, in which the semiconductor light-emitting apparatus is easily inserted into a prescribed position with confidence via the lamp holder attached to the housing thereof. Thus, the disclosed subject matter provides vehicle headlights using the reliable semiconductor light-emitting apparatuses, which can provide a favorable light distribution pattern, even when the semiconductor light-emitting apparatuses have been emitted for a long time in a small sealed housing.

BRIEF DESCRIPTION OF THE DRAWINGS

These and other characteristics and features of the disclosed subject matter will become clear from the following description with reference to the accompanying drawings, wherein:

FIG. 1c is a schematic enlarged front cross-sectional view showing an attaching portion of the semiconductor light-emitting apparatus in the vehicle headlight shown in FIG. 1a;

FIG. 2a is a schematic explanatory front cross-sectional view showing a semiconductor light-emitting apparatus of the first embodiment of the vehicle headlight shown in FIG. 1a, and FIG. 2b is a partial enlarged front cross-sectional view depicting a light-emitting portion of a wavelength converting layer and an incident portion of an optical fiber of the semiconductor light-emitting apparatus shown in FIG. 2a;

FIG. 8a is a schematic structural cross-sectional view depicting exemplary variations of a convex portion of the ferrule holder 9 shown in FIG. 3a, and FIG. 8b is a schematic structural cross-sectional view depicting exemplary variations of a concave portion of the ferrule holder shown in FIG. 3a;

DETAILED DESCRIPTION OF EXEMPLARY EMBODIMENTS

Figure 1A:
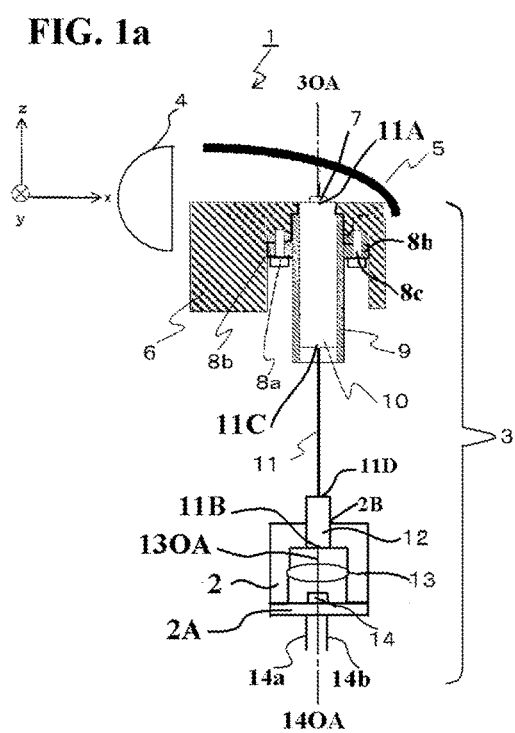
FIG. 1a is a schematic explanatory front cross-sectional view showing an exemplary embodiment of a vehicle headlight using a semiconductor light-emitting apparatus made in accordance with principles of the disclosed subject matter.

Exemplary embodiments and manufacturing methods of the disclosed subject matter will now be described in detail with reference to FIG. 1*a* to FIG. 12, in which the same or corresponding elements use the same reference marks. FIG. 1*a* is a schematic explanatory front cross-sectional view showing an exemplary embodiment of a vehicle headlight using a semiconductor light-emitting apparatus made in accordance with principles of the disclosed subject matter, FIG. 1*b* is a schematic explanatory front cross-sectional view showing a principal portion of the embodiment of the vehicle headlight shown in FIG. 1*a* without the semiconductor light-emitting apparatus, and FIG. 1*c* is a schematic enlarged front cross-sectional view showing an attaching portion of the semiconductor light-emitting apparatus to the vehicle headlight shown in FIG. 1*a*.

Figure 1B:
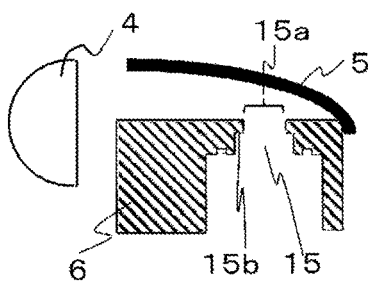
FIG. 1b is a schematic explanatory front cross-sectional view showing a principal portion of the embodiment of the vehicle headlight shown in FIG. 1a without the semiconductor light-emitting apparatus.
Figure 1C:
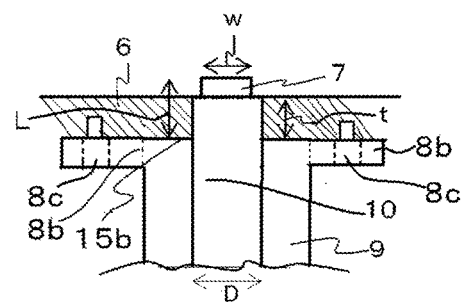

The vehicle headlight 1 can include: a semiconductor light-emitting apparatus 3 having a light-emitting optical axis 3OA configured to emit a mixture light, which mixes a part of light emitted directly from a semiconductor light-emitting chip 14 with light having a different wavelength converted by a wavelength converting layer 7 using another part of the light emitted from the semiconductor light-emitting chip 14 as an excited light; an projector lens 4 having an projector optical axis 4OA and at least one focus located on a substantially projector optical axis 4OA; at least one reflector having an optical reflector axis 5OA and at least one focus located on the optical reflector axis 5OA; and a lamp holder 6 including a fixing portion 15 having an opening 15*a* and a contacting surface 15*b* as shown in FIG. 1*b*. An exemplary structure of the vehicle headlight 1 will be described with reference to FIG. 12 later.

The semiconductor light-emitting apparatus 3 can include: a casing 2 having a base board 2A and a casing opening 2B; the semiconductor light-emitting chip 14 having electrodes and a chip optical axis 14OA located on the base board 2A of the casing 2, and each of the electrodes being electrically connected to a respective one of external electrodes 14*a* and 14*b* so as to receive a power supply, respectively; a focus lens 13 having a lens optical axis 13OA attached to the casing 2, the lens optical axis 13OA corresponding to the substantially light-emitting optical axis 14OA; and an optical fiber 11 having a light-emitting surface 11A and an incident surface 11B, which are exposed from the optical fiber 11, and the incident surface 11B being intersected with the light-emitting optical axis 14OA of the semiconductor light-emitting chip 14 so as to receive light emitted from the semiconductor light-emitting chip 14 via the focus lens 13, which focuses the light emitted from the semiconductor light-emitting chip 14 toward the light-emitting surface 11A of the optical fiber 11.

In addition, the semiconductor light-emitting apparatus 3 having the light-emitting optical axis 3OA can also include: a first ferrule 10 covering a light-emitting portion 11C having the light-emitting surface 11A of the optical fiber 11, and holding the optical fiber 11; the wavelength converting layer 7 attached on the first ferrule 10 and covering the light-emitting surface 11A of the optical fiber 11; a second ferrule 12 covering an incident portion 11D having the incident surface 11B of the optical fiber 11, holding the optical fiber 11 in an opposite direction of the first ferrule 10, and attached to the casing 2; and a ferrule holder 9 holding the first ferrule 10 at the light-emitting portion 11C of the optical fiber 11.

The ferrule holder 9 can also include a fixing plate 8*b*, which extends in an opposite direction of the first ferrule 10 and includes fixing holes 8*c* as shown in FIG. 1*c*. When the vehicle headlight 1 is manufactured by incorporating the semiconductor light-emitting apparatus 3 into the lamp holder 6, the ferrule holder 9 shown in FIG. 1*c* can be inserted into the fixing portion 15 of the lamp holder 6, and then the semiconductor light-emitting apparatus 3 can be attached to the lamp holder 6 of the vehicle headlight 1 via screws 8*a* with confidence as shown in FIG. 1*a*.

The first ferrule 10 can be formed in a substantially cylindrical shape to hold the optical fiber 11 therein. When a thermal conductivity of the ferrule holder 9 is smaller than that of the first ferrule 10, a length t of an inserted portion of the first ferrule 10 into the lamp holder 6 can be short to improve a radiating efficiency of heat generated from the wavelength converting layer 7. When the ferrule holder 9 is made from a metallic material, because the thermal conductivity of the ferrule holder 9 may be larger than that of the first ferrule 10, a diameter D of the first ferrule 10 can also be shorter than the double length t of the inserted portion of the first ferrule 10 as shown in FIG. 1*c*.

Next, the mixture light emitted by the semiconductor light-emitting chip 14 and the wavelength converting layer 7 will now be described in detail. As the semiconductor light-emitting chip 14, an LED of GaN series that emits blue light having a light-emitting wavelength of approximately 450 nanometers can be used, and also a laser diode having a light-emitting wavelength of approximately 450 nanometers and a light-emitting intensity of 10 watts that emits blue light can be used. An LED of InGaN series that emits near-ultraviolet light having a light-emitting wavelength of approximately 380 nanometers can also be used, and a laser diode that emits ultraviolet light can also be used as the semiconductor light-emitting chip 14.

In addition, as a package structure, a Transistor Outlined Can-typed (To-Can-typed) semiconductor light-emitting device can be used for the semiconductor light-emitting chip 14. In this case, a light source structure including the casing 2 incorporating the semiconductor light-emitting chip 14 therein, the external electrodes 14*a* and 14*b* and the like can be easily made by modifying a light source module including the To-Can-typed semiconductor light source device, which is disclosed in Patent document No. 3 that is owned by Applicant of this disclosed subject matter. Accordingly, detail descriptions of the light source structure will be abbreviated here.

The wavelength converting layer can include at least one of a yellow phosphor such as $Y_3Al_5O_{12}$: $Ce^{3+}$ (YAG) and the like, a red phosphor such as $CaAlSiN_3$: $Eu^{2+}$ and the like, a green phosphor such as $(Si, Al)_6 (O, N)$: $Eu^{2+}$ and the like, and a blue phosphor such as $(Sr, Ca, Ba, Mg)_{10}(PO_4)_6C_{12}$: $Eu^{2+}$, etc. For example, when the wavelength converting layer 7 includes a resin layer that is made by mixing the yellow phosphor of YAG with a transparent resin such as a silicone resin and when the semiconductor light-emitting chip 14 is a blue LED chip emitting blue light, the yellow phosphor can emit a yellow light upon being excited by blue light emitted from the blue LED chip. Accordingly, the semiconductor light-emitting apparatus 3 can emit the mixture light having a substantially white color tone by an additive color mixture of the excited yellow light emitted from the yellow phosphor and a part of the blue light emitted from the blue LED chip.

In place of the yellow phosphor, when the red phosphor wavelength-converts the blue light emitted from the blue LED chip into red-purple light and the green phosphor wavelength-converts the blue light into blue-green light, the semiconductor light-emitting apparatus 3 can also emit the mixture light including a substantially white light by an additive color mixture of the red-purple light emitted from the red phosphor that is excited by the blue light, the blue-green light emitted from the green phosphor that is excited by the blue light and a part of the blue light.

In addition, when the semiconductor light-emitting chip 14 is an LED of InGaN series that emits near-ultraviolet light having a wavelength of approximately 380 nanometers, a laser diode that emits ultraviolet light and the like, and when the wavelength converting layer 14 includes at least one of the red phosphor wavelength-converting the ultraviolet light into red light, the green phosphor wavelength-converting the ultraviolet light into green light and the blue phosphor wavelength-converting the ultraviolet light into blue light, the semiconductor light-emitting apparatus 3 can emit various colored lights including a substantially white light by an additive color mixture in accordance with a ratio of the above-described three color phosphors.

The wavelength converting layer 14 can be made by dispersing a powder of the above-described phosphor in a glass, and also a glass phosphor (e.g., oxynitride series glass phosphor such as Ca—Si—Al—O—N series, Y—Si—Al—O—N series, etc.) that adds a light-emitting ion into a glass including components such as phosphorus oxide ($P_2O_3$), silicon oxide ($SiO_2$), boron oxide ($B_2O_3$), aluminum oxide ($Al_2O_3$), etc. and a phosphor ceramic that is composed of a single crystal phosphor or a poly crystal phosphor can be used as the wavelength converting layer 14.

The phosphor ceramic can be made by forming a phosphor in a predetermined shape and by burning the phosphor. In the case, even when an organic material is used as a binder in a manufacturing process for the wavelength converting layer 14, because the organic component is burnt in a degreasing process after the forming process, the phosphor ceramic can include only the resin component of 5 wt percentages or less. As the phosphor ceramic of YAG for the wavelength converting layer 14, a YAG phosphor ceramic having a thickness of 300 micro meters to 600 micro meters can be used. The YAG phosphor ceramic can be formed in a size W of 1 millimeter square.

Figure 2A:
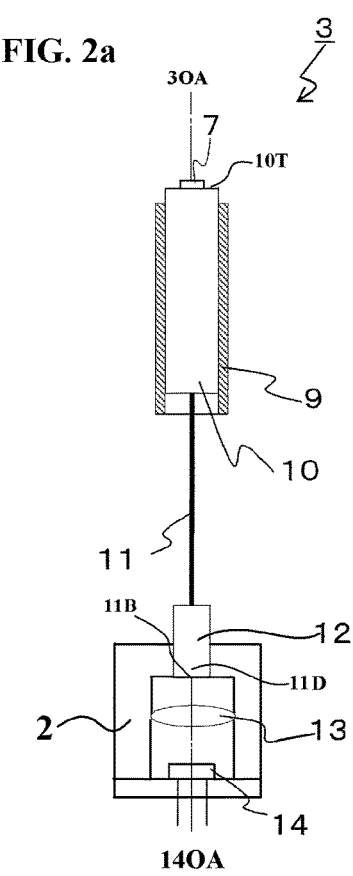
Figure 2B:
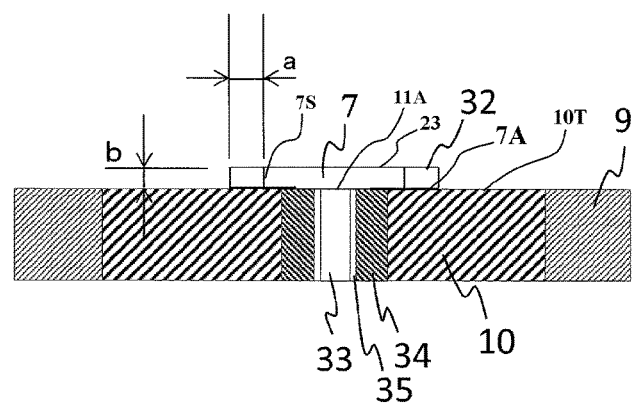

The optical fiber 11 to transmit the light emitted from the semiconductor light-emitting chip 14 toward the wavelength converting layer 7 will now be described with reference to FIG. 2a and FIG. 2b, which are a schematic explanatory front cross-sectional view showing the semiconductor light-emitting apparatus 3 shown in FIG. 1a and a partial enlarged front cross-sectional view depicting the light-emitting portion 11C of the wavelength converting layer 7 and an incident portion having the incident surface 11B of the optical fiber 7 of the semiconductor light-emitting apparatus 3 shown in FIG. 2a, respectively.

The optical fiber 11 can include: a core 33 including the light-emitting surface 11A and the incident surface 11B, in which the incident surface 11B receives a gathering light by the optical lens 13 using the light emitted from the semiconductor light-emitting chip 14, the core 33 transmits the gathering light toward the wavelength converting layer 7 and the light-emitting surface 11A enters the gathering light into the wavelength converting layer 7; a clad layer 35 covering the core 33 in order not to leak the gathering light from the core 33; and a coat 34 covering the clad layer 35 to protect the core 33 from external influence, etc.

As the optical fiber 11, a single mode fiber can be used, and also a multi-mode fiber can be used to transmit a large amount of the gathering light. An exemplary diameter of the core 33 can be approximately 100 micrometers to 300 micrometers, an exemplary thickness of the clad layer 35 can be several micrometers to several tens of micrometers, and an exemplary thickness of the coat 34 can be approximately 150 micrometers. As each material of the core 33 and the clad layer 35, a glass, fused quartz and a synthetic resin can be employed. An acrylic resin, a polyimide film and the like can be used as the coat 34.

The wavelength converting layer 14 which is attached on the first ferrule 10 via an adhesive material 7A and the like so as to cover the optical fiber 11 including the light-emitting surface 11A, can be formed in a substantially planar shape such as a rectangular shape, a square shape, circular shape, etc. An exemplary thickness of the wavelength converting layer 14 can be 10 micrometers to 600 micrometers in accordance with a kind of the above-described phosphors based upon various color tones of the mixture light.

In this case, a reflecting ring 32 formed in a substantially ring shape can contact with a side surface 7S of the wavelength converting layer 7. A white resin made by dispersing a reflective filler such as a particle of titanium oxide and the like into a resin such as a silicone resin and the like can be used as the reflecting ring 32. In this case, a thickness b of the reflecting ring 32 can be approximately 0.35 millimeters or more, which is a same thickness as the wavelength converting layer 7 or is thicker than that of the wavelength converting layer 7, and a width a of the reflecting ring 32 can be approximately 2 millimeters.

In addition, a metal such as aluminum, silver and an alloy including at least one of the aluminum and silver can be used as the reflecting ring 32. In this case, a thickness b of the reflecting ring 32 can be the same thickness as the wavelength converting layer 7, and an exemplary width a of the reflecting ring 32 can be approximately 1 micrometer or less. When the reflecting ring 32 is arranged around the wavelength converting layer 7, because light directed toward the reflecting ring 32 can return in a direction toward a top surface 23 of the wavelength converting layer 7 and because a part of the heat generated from the wavelength converting layer 7 can radiate from the reflecting ring 32, the semiconductor light-emitting apparatus 3 can improve a light-emitting intensity and a radiating efficiency.

Therefore, the disclosed subject matter can provide the reliable semiconductor light-emitting apparatus 3, which can emit various color lights including a substantially white color light having favorable optical characteristics.

Next, the ferrule holder 9 and the first ferrule 10 will now be described with reference to FIG. 3a to FIG. 4b. As described above in FIG. 1c, the first ferrule 10 can be formed in the substantially cylindrical shape to hold the optical fiber 11. The first ferrule 10 can be made from a metallic material or a ceramic to increase a radiating efficiency, mechanical intensity, etc. An inner diameter of the first ferrule 10 can be approximately 3 millimeter and a length of the first ferrule 10 can be approximately 20 millimeters. The ferrule holder 9 can be formed in a substantially cylindrical shape to hold the first ferrule 10.

Figure 3A:
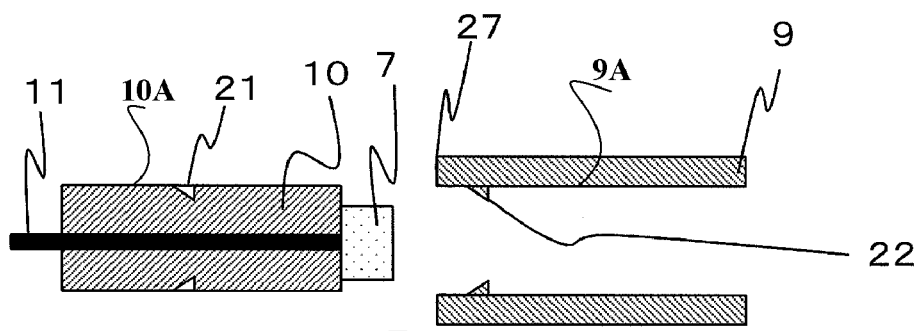
FIGS. 3a to 3c are enlarged side cross-sectional views showing a respective one of three locating states in each exemplary embodiment of a ferrule and a ferrule holder of the semiconductor light-emitting apparatus shown in FIG. 2a, respectively.

The ferrule holder 9 of the disclosed subject matter can be provided with a convex portion 22 on an inner surface 9A of the ferrule holder 9 as shown in FIG. 3a. The convex portion 22 can include at least one on the inner surface 9A of the ferrule holder 9, and also can be formed in a substantially ring shape. The first ferrule 10 can be provided with a concave portion 21 on an outer surface 10A thereof to insert the convex portion 22 of the ferrule holder 9 into the concave portion 21 of the first ferrule 10 as shown in FIG. 3a.

Figure 3B:
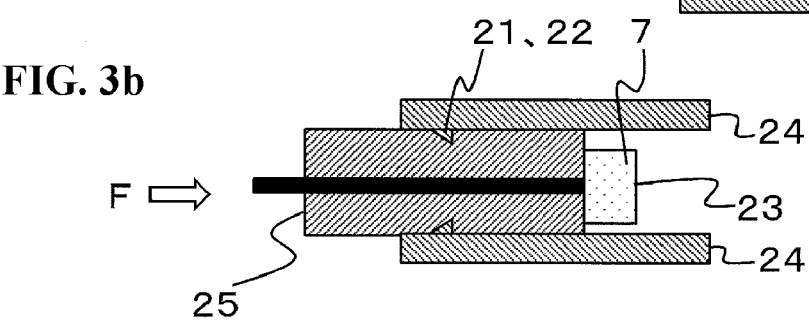
Figure 3C:
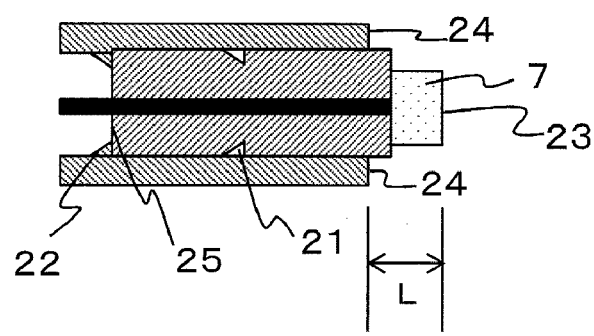

In this case, when an end surface 25 of the first ferrule 10 is pushed toward the wavelength converting layer 7 by a force F, the convex portion 22 of the ferrule holder 9 can be inserted into the concave portion 21 of the first ferrule 10 once as shown in FIG. 3b, and the end surface 25 of the first ferrule 10 can be stopped at the convex portion 22 of the ferrule holder 9 so that the top surface 23 of the wavelength converting layer 7 can project from a top surface 24 of the ferrule holder 9 at a distance L between the top surface 24 of the ferrule holder 9 and the top surface 23 of the wavelength converting layer 7.

The ferrule holder 9 can be made from a metallic material, a ceramic, a fiber-reinforced plastic and the like, in which the above materials having an elastic coefficient can be used as the ferrule holder 9 so as to easily insert the first ferrule 10 into the ferrule holder 9 including the convex portion 22. The ferrule holder 9 can be made from the metallic material so that a thickness thereof can be 0.1 millimeters 0.5 millimeters, and also can be made from a fiber-reinforced plastic so that the thickness thereof can be 0.5 millimeters to 3 millimeters.

Figures 4A, 4B:
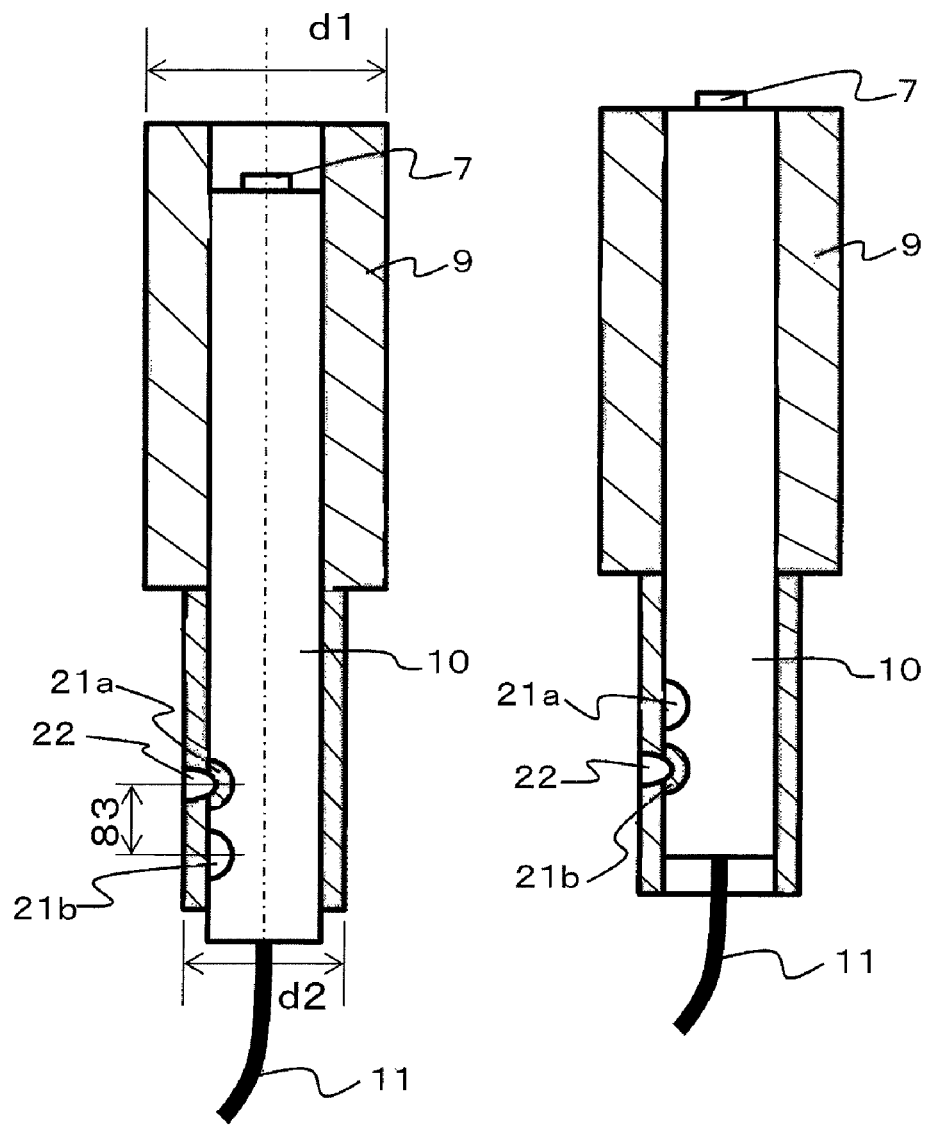
FIGS. 4a and 4b are an enlarged side cross-sectional views showing a respective one of two locating states in each other exemplary embodiment of the ferrule and the ferrule holder of the semiconductor light-emitting apparatus shown in FIG. 2a, respectively.

In addition, the ferrule holder 9 formed in the cylindrical shape can have a top diameter d1 and a bottom diameter d2, which is smaller than the top diameter d1 of the ferrule holder 9, and which includes the convex portion 22 on the inner surface 9A thereof, and the first ferrule 10 can include two concave portions 21a and 21b as shown in FIG. 4a. FIG. 4b shows a state in which the convex portion 22 of the ferrule holder 9 is inserted into the concave portion 21b of the first ferrule 10. In this case, the ferrule holder 9 can improve a radiating efficiency using a thick top portion having the top diameter d1, and also can improve an elastic coefficient using a thin bottom portion having the bottom diameter d2. These details will be described in various variations of the first embodiment of the semiconductor light-emitting apparatus 3 later.

Figure 5A:
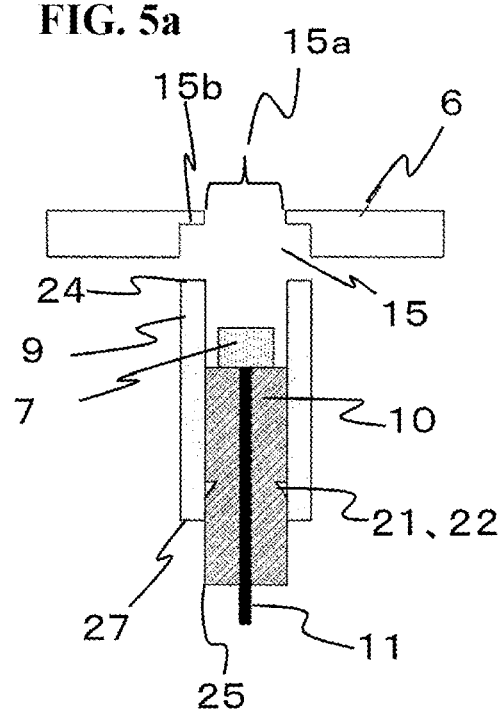
FIGS. 5a to 5c are enlarged side cross-sectional views showing a respective one of three locating states to attach the ferrule and the ferrule holder of the semiconductor light-emitting apparatus to a lamp holder shown in FIG. 1c, respectively.
Figure 5C:
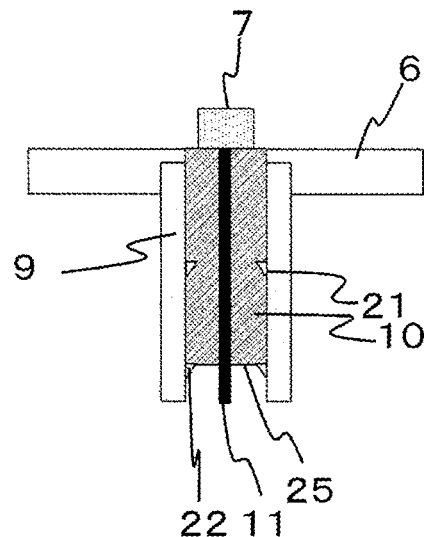
Figure 5B:
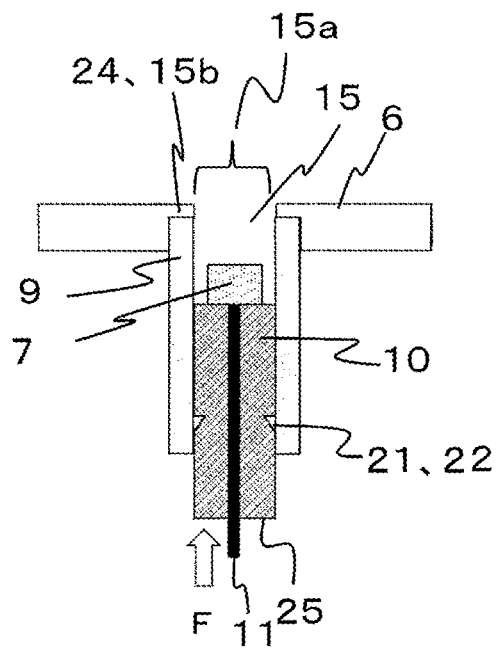

An exemplary method for inserting the ferrule holder 9 including the first ferrule 10 and the like into the lamp holder 6 will now be described with reference to FIG. 5a to FIG. 5c. FIG. 5a shows a state before inserting the ferrule holder 9 including the first ferrule 10 and the like into the lamp holder 6, FIG. 5b shows a state after inserting the ferrule holder 9 into the lamp holder 6 so that the top surface 24 of the ferrule holder 9 contacts with the contacting surface 15b of the fixing portion 15 having the opening 15a, and FIG. 5c shows a state after inserting the ferrule holder 9 into the lamp holder 6 and after inserting first ferrule 10 into the ferrule holder 9 so that the wavelength converting layer 7 projects from the opening 15a of the fixing portion 15 of the lamp holder 6. In this case, the ferrule holder 10 can be attached to the lamp holder 6 via an adhesive material. Additionally, as described above with reference to FIG. 1c, the ferrule holder 9 including the fixing plate 8b can also be attached to the lamp holder 6 via the screws 8a.

Figure 6:
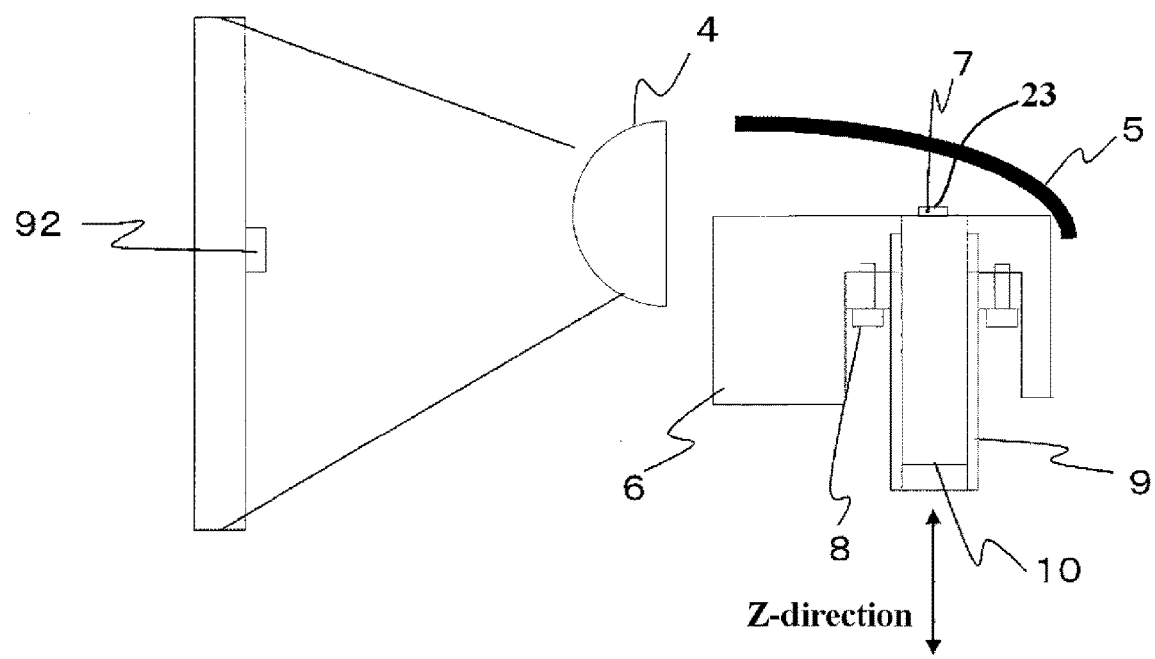
FIG. 6 is a schematic explanatory cross-sectional view depicting a method for measuring a light-intensity variation of the semiconductor light-emitting apparatus by a light-emitting detector located at mark 92, when the light-emitting apparatus is slid in a vertical direction of Z-direction.
Figure 7:
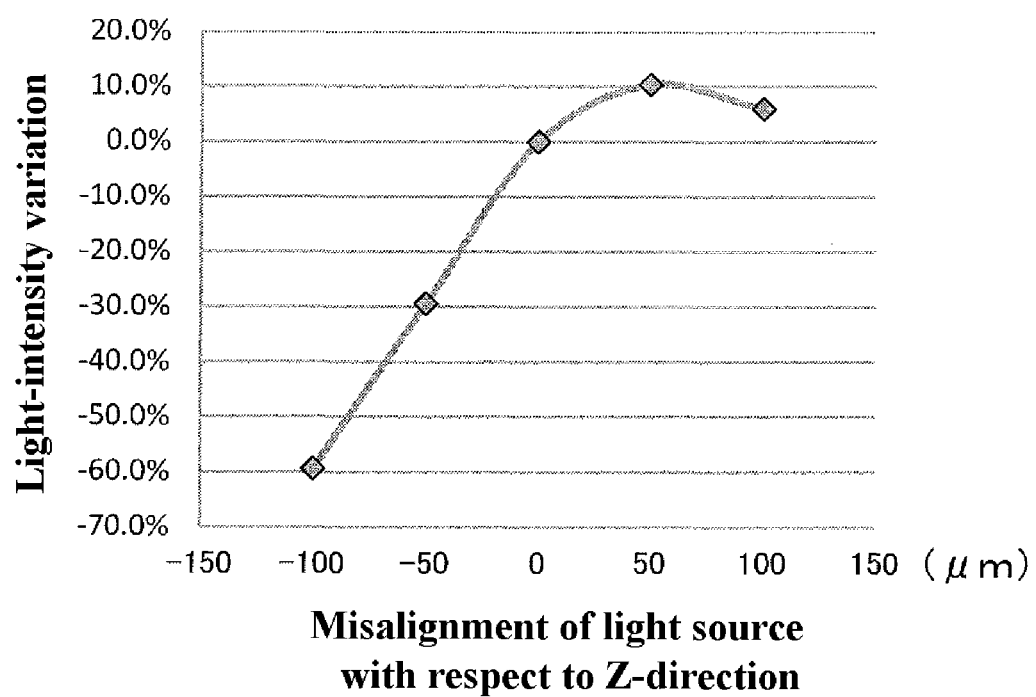
FIG. 7 is a graph showing a relation of the light-intensity variation of the semiconductor light-emitting apparatus with respect to a misalignment of the semiconductor light-emitting apparatus in Z-direction.

FIG. 6 is a schematic explanatory cross-sectional view depicting a method for measuring a light-intensity variation of the semiconductor light-emitting apparatus 3 by a light-emitting detector located at mark 92, when the semiconductor light-emitting apparatus 3 is slid in a vertical direction of Z-direction. As shown in FIG. 7, even when a misalignment of a light-emitting surface (the top surface 24 of the wavelength converting layer 7) of the semiconductor light-emitting apparatus 3 is only −50 micrometers, the light-emitting intensity will decrease approximately 30 percentages.

However, according to the semiconductor light-emitting apparatus 3 of disclosed subject matter, after the top surface 24 of the ferrule holder 9 can contact with the contacting surface 15b of the fixing portion 15 of the lamp holder 6 and the convex portion 22 of the ferrule holder 9 can be inserted into the concave portions 21b of the first ferrule 10, the semiconductor light-emitting apparatus 3 can be attached to the lamp holder 6 with confidence as described above. Therefore, the disclosed subject matter can provide the reliable semiconductor light-emitting apparatus 3 having favorable optical characteristics and a high workability, which can prevent the misalignment even when a vehicle moves.

Figure 8A:
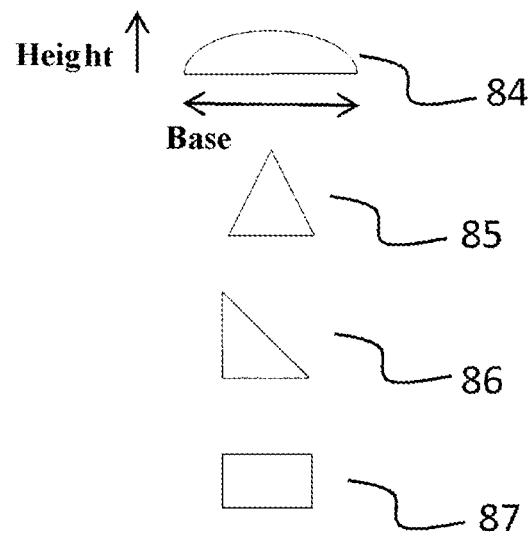
Figure 8B:
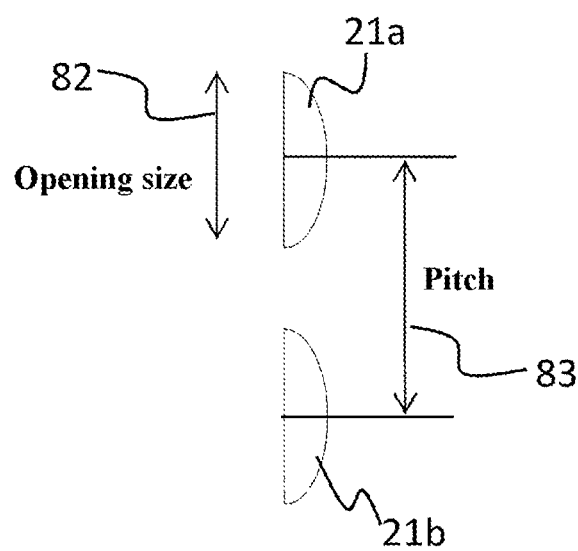

Various variations of the convex portion 22 of the ferrule holder 9 will now be shown by FIG. 8a and FIG. 8b. A half-ellipsoidal shape 84, a triangle shape 85, a right triangle shape 86, a rectangular shape 87 and the like can be used as the convex portion 22 in a cross-sectional shape at a substantially right angle with respect to the inner surface 9A in a height direction thereof. As the concave portion 21a and the convex portion 21b shown in FIGS. 4a and 4b, half-ellipsoidal shapes having an opening sixe 82 and a pitch 83 can be used in a cross-sectional shape at a substantially right angle with respect to the outer surface 10A of the first ferrule 10 in a height direction thereof.

Exemplary variations of the semiconductor light-emitting apparatus will now be described with reference to FIG. 9a to FIG. 11c. The variations mainly relate to the concave portion 21 of the first ferrule 10 and the convex portion 22 of the ferrule holder 9, and therefore will now be described with respect to variations of the first ferrule 10, the ferrule holder 9 and elements associated with the first ferrule 10 and the ferrule holder 9.

Figure 9A:
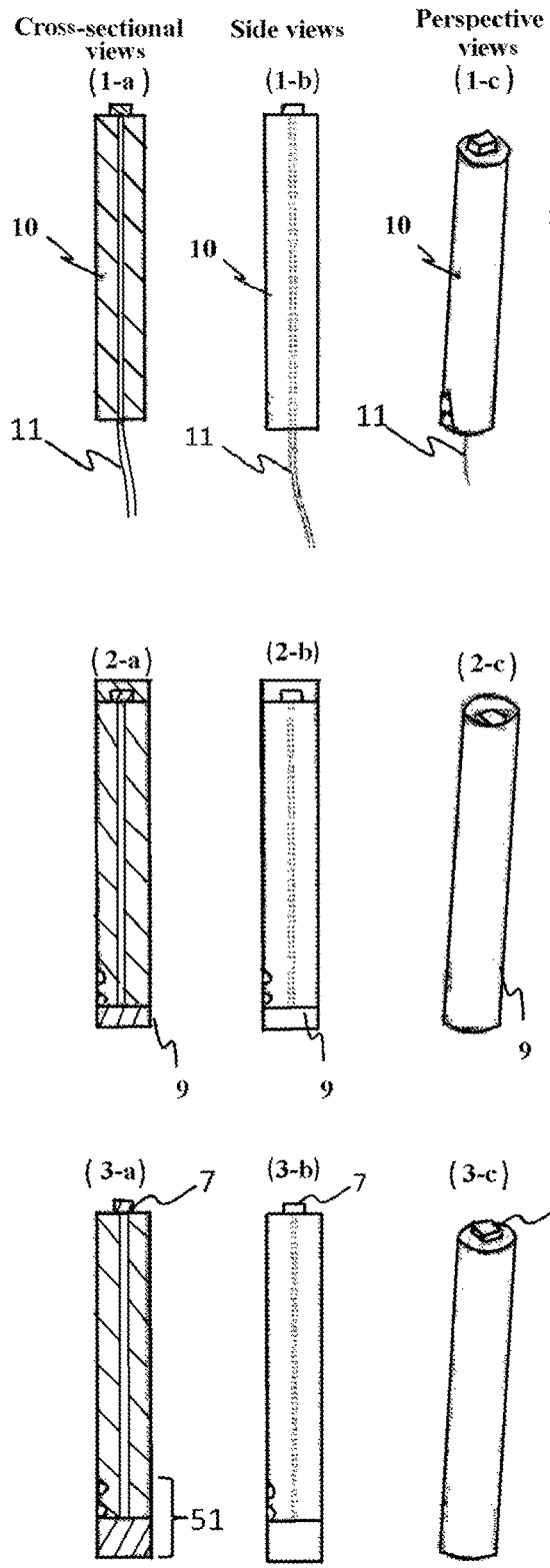
FIG. 9a is each of cross-sectional views (1-a, 2-a, and 3-a), side views (1-b, 2-b and 3-b) and perspective views (1-c, 2-c and 3-c) corresponding to each of the cross-sectional views (1-a, 1-b and 1-c), respectively, inserting states of the wavelength converting layer into the ferrule (2-a, 2-b and 2-c) and projecting states of the wavelength converting layer from the ferrule holder in (3-a, 3-b and 3-c) in a first exemplary variation of the semiconductor light-emitting apparatus, respectively.
Figure 9B:
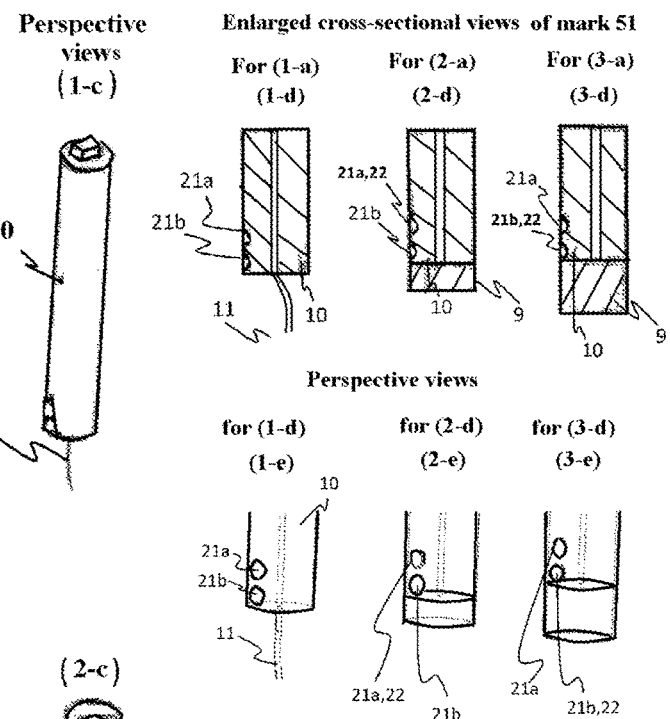
FIG. 9b is each of enlarged cross-sectional views (1-d, 2-d and 3-d) at a region 51 of (1-a), (2-a) and (3-a), and each of perspective views (1-e, 2-e and 3-e) of the enlarged cross-sectional views (1-d), (2-d) and (3-d), respectively.

As a first exemplary variation shown in FIGS. 9a and 9b, FIG. 9a shows each of cross-sectional views of 1-a of the first ferrule 10 and 2-a and 3-a of the ferrule holder 9, side views of 1-b of the first ferrule 10 and 2-b and 3-b of the ferrule holder 9, and perspective views of 1-c of the first ferrule 10 and 2-c and 3-c of the ferrule holder 9 corresponding to each of the cross-sectional views of 1-a, 1-b and 1-c, respectively, inserting states of the wavelength converting layer 7 into the ferrule holder 9 of 2-a, 2-b and 2-c and projecting states of the wavelength converting layer 7 from the ferrule holder 9 in 3-a, 3-b and 3-c, respectively. FIG. 9b shows each of enlarged cross-sectional views (1-d, 2-d and 3-d) at a region 51 of (1-a), (2-a) and (3-a), respectively, and show each of perspective views (1-*e*, 2-*e* and 3-*e*) of the enlarged cross-sectional views (1-*d*), (2-*d*) and (3-*d*), respectively.

Accordingly, the first ferrule 9 can be attached at a predetermined position of the ferrule holder 10 by inserting the convex portion 22 of the ferrule holder 9 into the concave portion 21*b* of the first ferrule 10 after inserting the convex portion 22 of the ferrule holder 9 into the concave portion 21*a* of the first ferrule 10 with confidence. The first ferrule 10 can include the concave portions 21*a* and 21*b* on the outer face 10A thereof, and therefore can be attached to the ferrule holder 9 not only in a horizontal direction but also in a turning direction of the inner face 9A thereof with confidence.

Figure 10A:
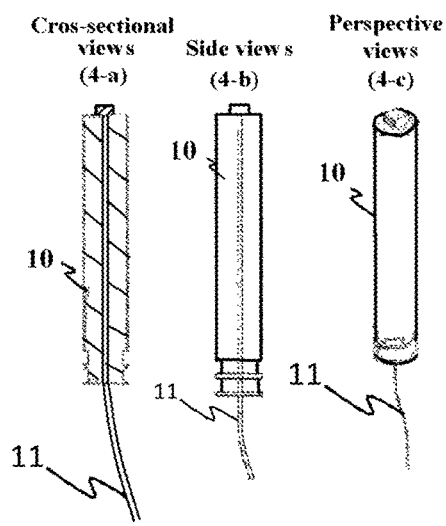
FIG. 10a is each of cross-sectional views of (4-a, 5-a, and 6-a), side views of (4-b, 5-b and 6-b) and perspective views (4-c, 5-c and 6-c) corresponding to each of the cross-sectional views (4-a, 5-a and 6-a), respectively, inserting states of the wavelength converting layer into the ferrule (5-*a*, 5-*b* and 5-*c*) and projecting states of the wavelength converting layer from the ferrule holder in (4-*a*, 4-*b* and 4-*c*) in a second exemplary variation of the semiconductor light-emitting apparatus, respectively.
Figure 10A:
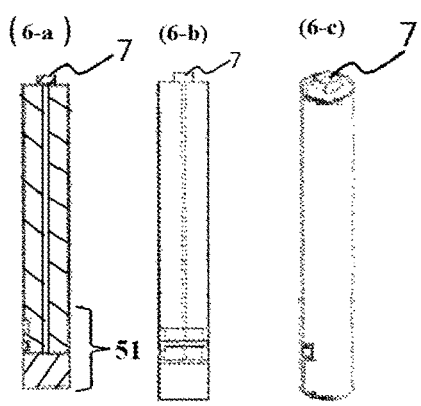
Figure 10B:
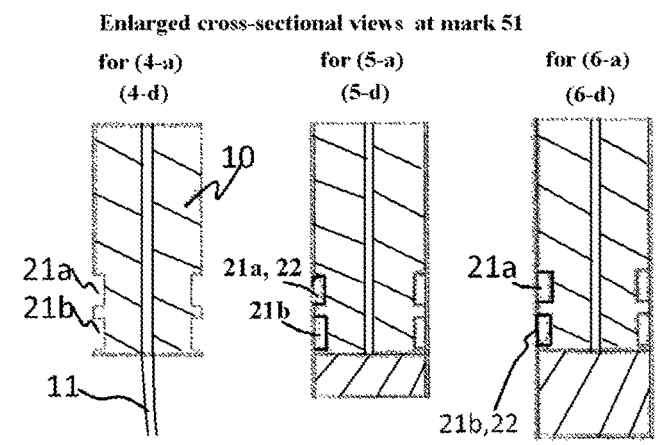
FIG. 10*b* is each of enlarged cross-sectional views (4-*d*, 5-*d* and 6-*d*) at a region 51 of (4-*a*), (5-*a*) and (6-*a*), respectively, and each of perspective views (4-*e*, 5-*e* and 6-*e*) of the enlarged cross-sectional views (4-*d*, 5-*d* and 6-*d*), respectively.
Figure 10B:
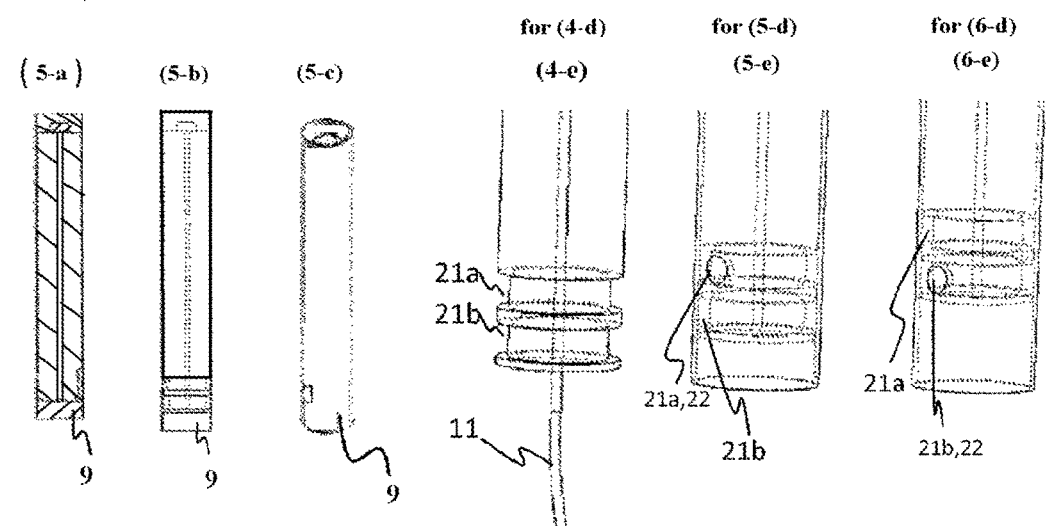

As a second exemplary variation shown in FIGS. 10*a* and 10*b*, FIG. 10*a* shows each of cross-sectional views of 4-*a* of the first ferrule 10 and 5-*a* and 6-*a* of the ferrule holder 9, side views of 4-*b* of the first ferrule 10 and 5-*b* and 6-*b* of the ferrule holder 9, and perspective views of 4-*c* of the first ferrule 10 and 5-*c* and 6-*c* of the ferrule holder 9 corresponding to each of the cross-sectional views of 4-*a*, 5-*a* and 6-*a*, respectively, inserting states of the wavelength converting layer 7 into the first ferrule 9 of 5-*a*, 5-*b* and 5-*c* and projecting states of the wavelength converting layer 7 from the ferrule holder 9 in 4-*a*, 4-*b* and 4-*c*, respectively. FIG. 10*b* shows each of enlarged cross-sectional views 4-*d*, 5-*d* and 6-*d* at a region 51 of 4-*a*, 5-*a*, and 6-*a*, respectively, and each of perspective views 4-*e*, 5-*e* and 6-*e* of the enlarged cross-sectional views 4-*d*, 5-*d* and 6-*d*, respectively.

Differences between the second variation and the first variation relate to the concave portions 21*a* and 21*b* on the outer surface 10A of the first ferrule 10, which are compassed at 360 degrees and are formed in a ring shape on outer surface 10A of the first ferrule 10. Accordingly, the first ferrule 10 can be easily attached to the ferrule holder 10 by inserting the convex portion 22 of the ferrule holder 10 into the concave portion 21*b* of the first ferrule 10. When the first ferrule 10 is attached to the ferrule holder 9 at a predetermined position in the turning direction of the inner surface 9A of the ferrule holder 9, the first ferrule 10 can be attached at the predetermined position via an adhesive material after inserting the convex portion 22 of the ferrule holder 9 into the concave portion 21*a* of the first ferrule 10.

Figure 11A:
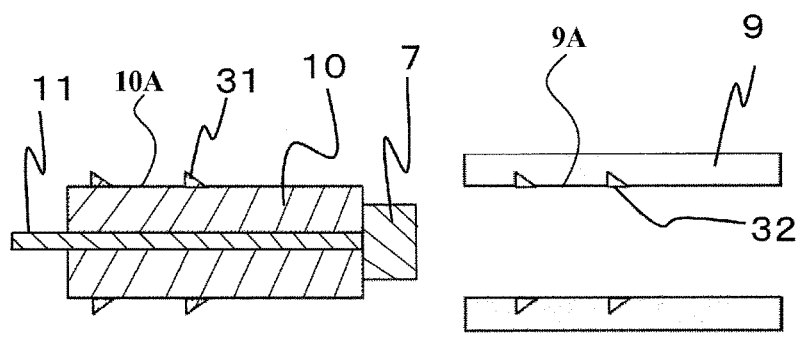
FIGS. 11*a* to 11*c* are enlarged side cross-sectional views showing a respective one of three locating states of the ferrule and the ferrule holder in a third exemplary variation of the semiconductor light-emitting apparatus, respectively.
Figure 11B:
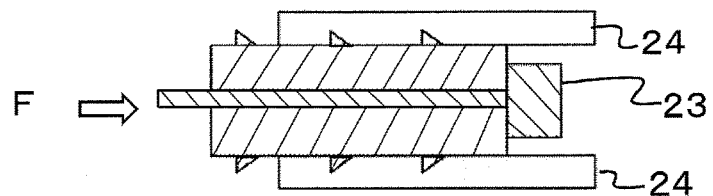
Figure 11C:
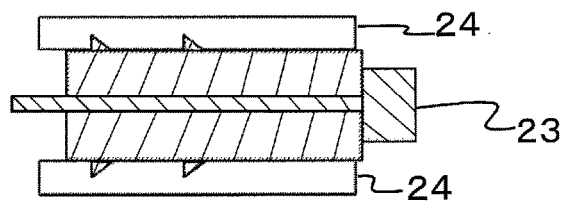

With respect to a third exemplary variation shown in FIG. 11*a* to 11 *c*, differences between the third variation and the first embodiment of the semiconductor light-emitting apparatus relate to a plurality of convex portions 31, which is located on the outer surface 10A of the first ferrule 10, and a plurality of concave portions 32 on the inner surface 9A of the ferrule holder 9, which respectively correspond to the plurality of convex portions 31 located on the outer surface 10A of the first ferrule 10, in the third variation of the semiconductor light-emitting apparatus. FIG. 11*a* shows a separate state between the first ferrule 10 and the ferrule holder 9, FIG. 11*b* shows an inserting state in which the first ferrule 10 is inserted into the ferrule holder 9 by a force F, and FIG. 11*c* show an inserted state of the first ferrule 10 into the ferrule holder 9. The third variation can also provide the reliable semiconductor light-emitting apparatus in common with the first embodiment of the disclosed subject matter as described above.

Figure 12:
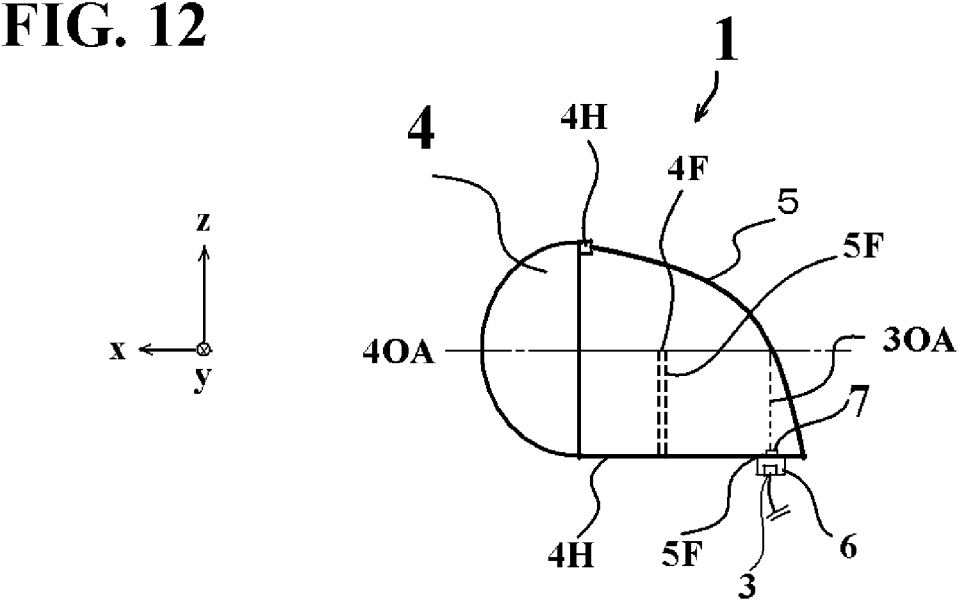
FIG. 12 is a schematic side cross-sectional view showing an exemplary embodiment of a vehicle headlight using the semiconductor light-emitting apparatus made in accordance with principles of the disclosed subject matter.
Figure 13:
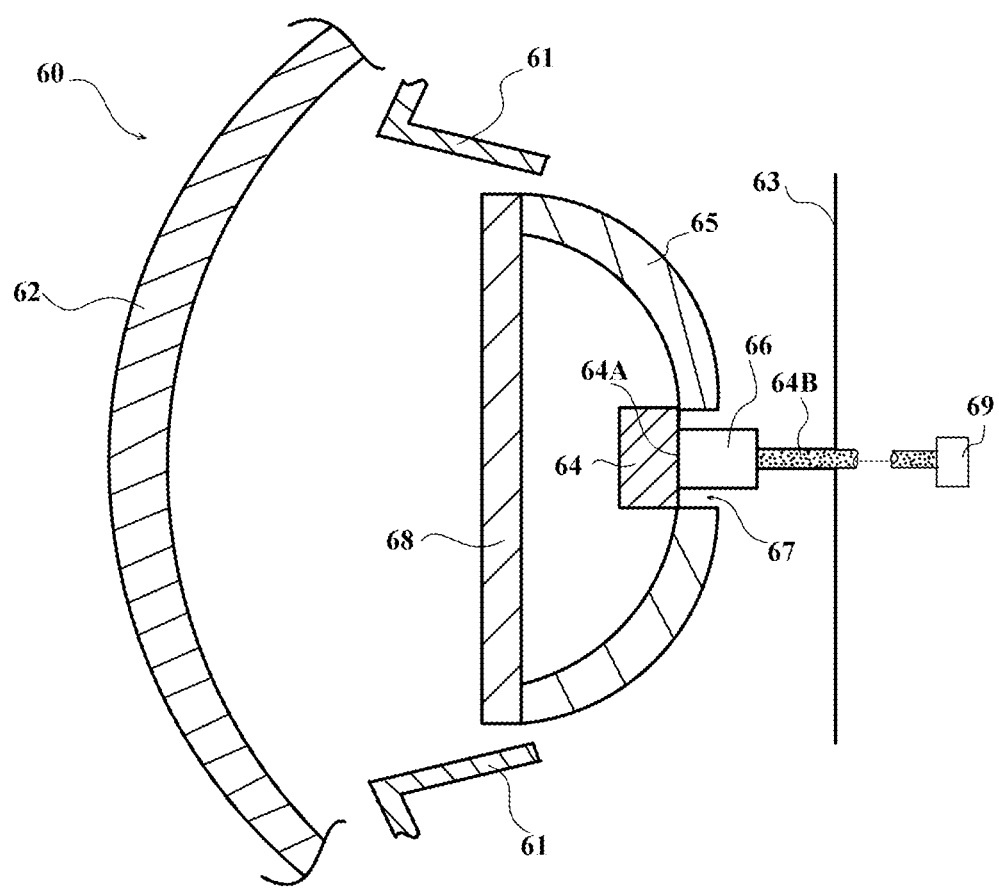
FIG. 13 is a schematic partial side cross-sectional view showing a conventional vehicle headlight using a semiconductor light-emitting apparatus including a wavelength converting layer and an optical fiber.
Figure 14:
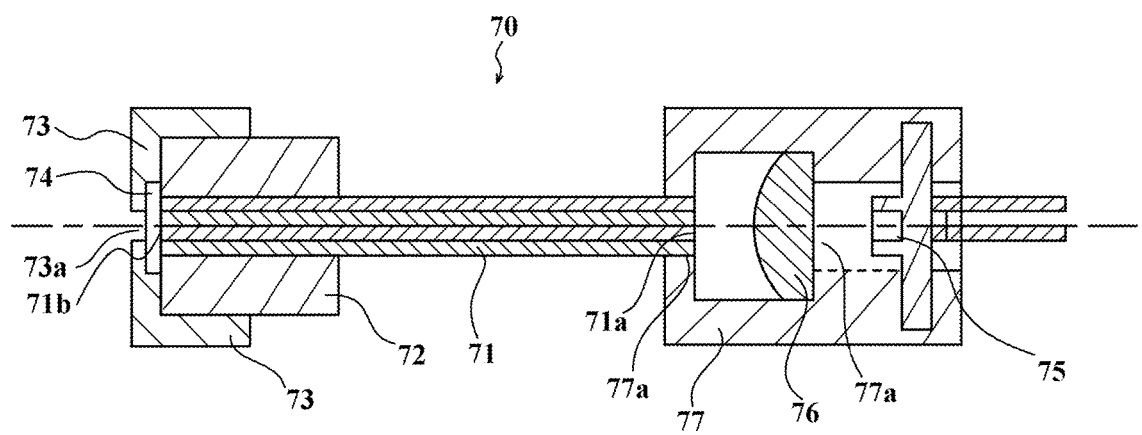
FIG. 14 is a schematic enlarged side cross-sectional view showing a conventional semiconductor light-emitting apparatus for another conventional vehicle headlight.

Next, the exemplary structure of the vehicle headlight 1 will now be described with reference to FIG. 12. The vehicle headlight 1 can include: the projector lens 4 having an projector optical axis 4OA and at least one focus 4F located on the substantially projector optical axis 4OA; the reflector 5 having at least one reflector focus 5F; a housing 4H attaching the projector lens 4 and the reflector 5: the lamp holder 6 attached to the housing 4H; and the semiconductor light-emitting apparatus 3 having a light-emitting optical axis 3OA attached to the lamp holder 6, wherein the light-emitting surface (the top surface 23) of the wavelength converting layer 7 is located at the substantially reflector focus 5F of the reflector 5; and wherein the substantially projector optical axis 4OA of the projector lens 4 intersects with the reflector 5, and the light-emitting optical axis 3OA intersects at a point where the substantially projector optical axis 4OA of the projector lens 4 intersects with the reflector 5.

In such a structure, the vehicle headlight 1 can emit the mixture light having a substantially white color tone toward a road (X-direction) by reflecting the mixture light emitted from the wavelength converting layer 7 of the semiconductor light-emitting apparatus 3 on the reflector 5 and by forming a favorable light distribution pattern using the reflected light via the projector lens 4. In this case, as described above, after the top surface 24 of the ferrule holder 9 contacts with the contacting surface 15*b* of the fixing portion 15 of the lamp holder 6 and the convex portion 22 of the ferrule holder 9 is inserted into the concave portions 21*b* of the first ferrule 10, the semiconductor light-emitting apparatus 3 can be attached to the lamp holder 6 with confidence. Therefore, the disclosed subject matter can provide a vehicle headlight using the semiconductor light-emitting apparatuses with a simple structure, which provide a favorable light distribution pattern for drivers.

It may be easy for the above-described structure to provide the favorable light distribution pattern for a high beam. When the vehicle headlight 1 provides a favorable light distribution pattern for a low beam, the vehicle headlight 1 can include a shade 5F at the focus 4F of the projector lens 4 to prevent a glare typed light, which is emitted in an upward direction of a horizontal direction (y-direction). The shade 5F can also be attached to the housing 4H. Therefore, the disclosed subject matter can provide a vehicle headlight using the semiconductor light-emitting apparatuses with a simple structure, which provide the favorable light distribution patterns for drivers.

In addition, the above-described embodiments are mainly described as a light source device for a vehicle headlight. However, the semiconductor light-emitting apparatus can incorporate various colored lights by combining the above-described semiconductor chip 14 with the wavelength converting layer 7 including at least one phosphor, and therefore can also be used as a light source device for various applications such as general lighting, a street light, stage lighting, traffic lights and the like using a small and simple optical member. Moreover, it is conceived that each of the different aspects and features of the different embodiments disclosed herein could be used interchangeably in and with the other disclosed embodiments. For example, the first ferrule 10 can be formed in a substantially tubular shape such as a rectangular shape in a cross-sectional view as shown in FIG. 12 in Japanese Patent Application No. 2014-238266 based upon the disclosed subject matter. Furthermore, each of the specifically referenced features of each of the disclosed embodiments can be interchanged with each other in the various embodiments in all possible combinations of the referenced features.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entireties by reference.

What is claimed is:

1. A semiconductor light-emitting apparatus having a light-emitting optical axis, comprising:
    a casing having a base board and an casing opening, and the base board facing the casing opening;
    a semiconductor light-emitting chip having a chip optical axis located on the base board of the casing;
    an optical fiber having a light-emitting surface, an incident surface, a light-emitting portion including the light-emitting surface and an incident portion including the incident surface, each of the light-emitting surface and the incident surface of optical fiber being exposed from the optical fiber, the incident portion of the optical fiber attached into the casing opening of the casing, and the incident surface facing the semiconductor light-emitting chip and being intersected with the light-emitting optical axis of the semiconductor light-emitting chip;
    a first ferrule having an outer surface, a bottom surface and a top surface covering the light-emitting portion of the optical fiber, and holding the optical fiber, and the outer surface of the first ferrule including at least one convex portion;
    a ferrule holder having an inner surface and a top surface formed in a substantially tubular shape, covering the first ferrule and attaching the first ferrule, and the inner surface of the ferrule holder including at least one concave portion;
    a wavelength converting layer having a top surface and a side surface formed in a substantially planar shape, including at least one phosphor, covering the light-emitting surface of the optical fiber and being attached on the top surface of the first ferrule; and
    wherein the convex portion of the first ferrule is inserted into the at least one concave portion of the ferrule holder in order for the first ferrule to be attached to the ferrule holder, and the top surface of the wavelength converting layer projects from the top surface of the ferrule holder by a distance between the top surface of the ferrule holder and the top surface of the wavelength converting layer.

2. A semiconductor light-emitting apparatus having a light-emitting optical axis comprising:
    a casing having a base board and an casing opening, and the base board facing the casing opening;
    a semiconductor light-emitting chip having a chip optical axis located on the base board of the casing;
    an optical fiber having a light-emitting surface, an incident surface, a light-emitting portion including the light-emitting surface and an incident portion including the incident surface, each of the light-emitting surface and the incident surface of optical fiber being exposed from the optical fiber, the incident portion of the optical fiber attached into the casing opening of the casing, and the incident surface facing the semiconductor light-emitting chip and being intersected with the light-emitting optical axis of the semiconductor light-emitting chip;
    a first ferrule having an outer surface and a top surface covering the light-emitting portion of the optical fiber, and holding the optical fiber, and the outer surface of the first ferrule including at least one concave portion;
    a ferrule holder having an inner surface and a top surface formed in a substantially tubular shape, covering the first ferrule and attaching the first ferrule via an adhesive material, and the inner surface of the ferrule holder including at least one convex portion;
    a wavelength converting layer having a top surface and a side surface formed in a substantially planar shape, including at least one phosphor, covering the light-emitting surface of the optical fiber and being attached on the top surface of the first ferrule; and
    wherein the convex portion of the ferrule holder is inserted into the concave portion of the first ferrule in order for the first ferrule to be attached to the ferrule holder, and thereby the top surface of the wavelength converting layer projects from the top surface of the ferrule holder by a distance between the top surface of the ferrule holder and the top surface of length converting layer.

3. The semiconductor light-emitting apparatus having a light-emitting optical axis according to claim 1, further comprising;
    a second ferrule located between the incident portion of the optical fiber and the casing opening of the casing, attaching the incident portion of the optical fiber thereto and being attached into the casing opening of the casing.

4. The semiconductor light-emitting apparatus having a light-emitting optical axis according to claim 2, further comprising;
    a second ferrule located between the incident portion of the optical fiber and the casing opening of the casing, attaching the incident portion of the optical fiber thereto and being attached into the casing opening of the casing.

5. The semiconductor light-emitting apparatus having a light-emitting optical axis according to claim 1, further comprising;
    a focus lens having a lens optical axis located between the incident surface of the optical fiber and the semiconductor light-emitting chip, and attached to the casing, wherein the lens optical axis of the focus lens corresponds to the substantially chip optical axis of the semiconductor light-emitting chip.

6. The semiconductor light-emitting apparatus having a light-emitting optical axis according to claim 2, further comprising;
    a focus lens having a lens optical axis located between the incident surface of the optical fiber and the semiconductor light-emitting chip, and attached to the casing, wherein the lens optical axis of the focus lens corresponds to the substantially chip optical axis of the semiconductor light-emitting chip.

7. The semiconductor light-emitting apparatus having a light-emitting optical axis according to claim 3, further comprising;
    a focus lens having a lens optical axis located between the incident surface of the optical fiber and the semiconductor light-emitting chip, and attached to the casing, wherein the lens optical axis of the focus lens corresponds to the substantially chip optical axis of the semiconductor light-emitting chip.

8. The semiconductor light-emitting apparatus having a light-emitting optical axis according to claim 4, further comprising;
    a focus lens having a lens optical axis located between the incident surface of the optical fiber and the semiconductor light-emitting chip, and attached to the casing, wherein the lens optical axis of the focus lens corresponds to the substantially chip optical axis of the semiconductor light-emitting chip.

9. The semiconductor light-emitting apparatus having a light-emitting optical axis according to claim 1, further comprising;
a reflecting ring formed in a substantially ring shape, and contacting with the side surface of the wavelength converting layer.

10. The semiconductor light-emitting apparatus having a light-emitting optical axis according to claim 2, further comprising;
a reflecting ring formed in a substantially ring shape, and contacting with the side surface of the wavelength converting layer.

11. The semiconductor light-emitting apparatus having a light-emitting optical axis according to claim 1, wherein the first ferrule includes a plurality of concave portions, and also the first ferrule includes a plurality of convex portions corresponding to the concave portions of the first ferrule.

12. The semiconductor light-emitting apparatus having a light-emitting optical axis according to claim 2, wherein the first ferrule includes a plurality of convex portions, and also the first ferrule includes a plurality of concave portions corresponding to the convex portions of the first ferrule.

13. The semiconductor light-emitting apparatus having a light-emitting optical axis according to claim 1, wherein the at least one convex portion of the first ferrule is formed in a substantially ring shape, and also the at least one concave portion of the ferrule holder is formed in a substantially ring shape so as to correspond to the at least one convex portion of the first ferrule.

14. The semiconductor light-emitting apparatus having a light-emitting optical axis according to claim 2, wherein the at least one concave portion of the first ferrule is formed in a substantially ring shape, and also the at least one convex portion of the ferrule holder is formed in a substantially ring shape so as to correspond to the at least one concave portion of the first ferrule.

15. The semiconductor light-emitting apparatus having a light-emitting optical axis according to claim 1, a semiconductor laser diode emitting blue light is used as the semiconductor light-emitting chip, and a YAG phosphor ceramic is used as the wavelength converting layer.

16. The semiconductor light-emitting apparatus having a light-emitting optical axis according to claim 2, a semiconductor laser diode emitting blue light is used as the semiconductor light-emitting chip, and a YAG phosphor ceramic is used as the wavelength converting layer.

17. A vehicle headlight including the semiconductor light-emitting apparatus according to claim 1, further comprising:
a housing;
a projector lens having a projector optical axis and at least one focus, attached to the housing;
a reflector having at least one focus facing the projector lens, and attached to the housing;
a lamp holder being attached to the housing;
the semiconductor light-emitting apparatus having the light-emitting optical axis attached to the lamp holder; and
wherein the projector optical axis of the projector lens intersects with the reflector, and the light-emitting optical axis intersects with the reflector at a point where the projector optical axis of the projector lens intersects with the reflector.

18. A vehicle headlight including the semiconductor light-emitting apparatus according to claim 2, further comprising:
a housing;
a projector lens having a projector optical axis and at least one focus, attached to the housing;
a reflector having at least one focus facing the projector lens, and attached to the housing;
a lamp holder being attached to the housing;
the semiconductor light-emitting apparatus having the light-emitting optical axis attached to the lamp holder; and
wherein the projector optical axis of the projector lens intersects with the reflector, and the light-emitting optical axis intersects with the reflector at a point where the projector optical axis of the projector lens intersects with the reflector.

19. A vehicle headlight including the semiconductor light-emitting apparatus according to claim 17, further comprising:
a shade having a top surface, and attached to the housing, and the top surface of the shade located at the focus of the projector lens.

20. A vehicle headlight including the semiconductor light-emitting apparatus according to claim 18, further comprising:
a shade having a top surface, and attached to the housing, and the top surface of the shade located at the focus of the projector lens.

* * * * *